United States Patent [19]

Smejkal

[11] 4,363,461

[45] Dec. 14, 1982

[54] TAPE READER MOTOR MOUNT

[75] Inventor: George Smejkal, Mt. Prospect, Ill.

[73] Assignee: Extel Corporation, Northbrook, Ill.

[21] Appl. No.: 182,968

[22] Filed: Sep. 2, 1980

[51] Int. Cl.³ .............................................. F16M 1/00
[52] U.S. Cl. .................................... 248/655; 248/27.1
[58] Field of Search ............... 248/655, 658, 674, 656, 248/665, 27.1, 603, 605, 606, 652

[56] References Cited

U.S. PATENT DOCUMENTS

| | | | |
|---|---|---|---|
| 1,383,683 | 7/1921 | Wenderhold | 248/652 X |
| 1,413,028 | 4/1922 | Ireland et al. | 248/655 |
| 1,482,370 | 1/1924 | Spilger | 248/655 |
| 1,848,353 | 3/1932 | Kelso et al. | 248/656 X |
| 1,894,904 | 1/1933 | DeRabot | 248/658 X |
| 3,432,705 | 3/1969 | Lindtveit | 248/674 X |
| 4,051,916 | 10/1977 | Oda | 248/27.1 X |
| 4,155,528 | 5/1979 | Dawson | 248/674 |

FOREIGN PATENT DOCUMENTS 823435  10/1951  Fed. Rep. of Germany ...... 248/656

Primary Examiner—William E. Lyddane
Assistant Examiner—Peter A. Aschenbrenner
Attorney, Agent, or Firm—Kinzer, Plyer, Dorn & McEachran

[57] ABSTRACT

An alignment mechanism for a paper tape reader in which the motor and drive sprocket assembly is firmly, but not rigidly, affixed to a base plate of the main reader unit by a plurality of compressive spring fasteners. Arcuate slots in a motor mounting base plate, in conjunction with spring-biased retainers projecting through those slots and secured to bosses on a reader base plate, maintain the two base plates in spaced parallel relation and permit limited angular rotation of the motor and drive sprocket assembly, thus facilitating angular adjustment of the motor. A bias spring applies a torsional force to the motor assembly, forcing it against an adjustable screw stop. Adjustment of this screw results in rapid and precise single-step alignment without the often disruptive further step of tightening retention fasteners.

7 Claims, 6 Drawing Figures

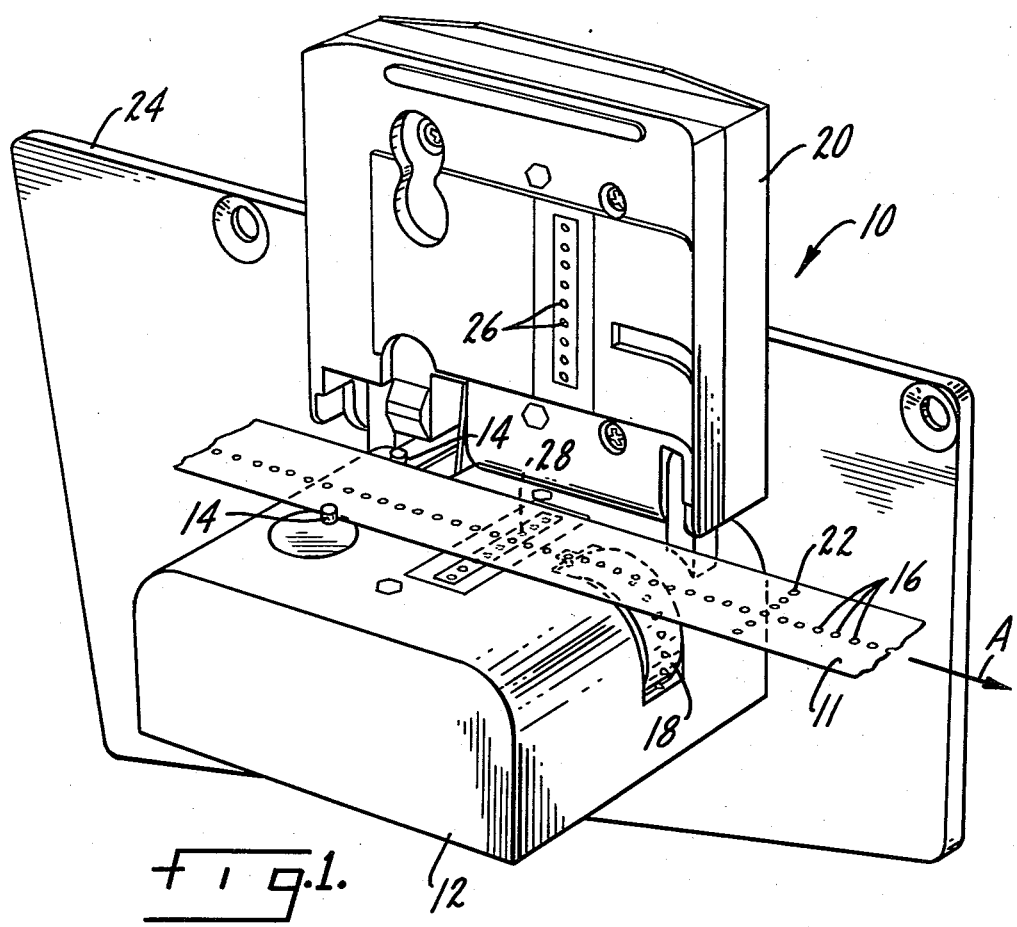
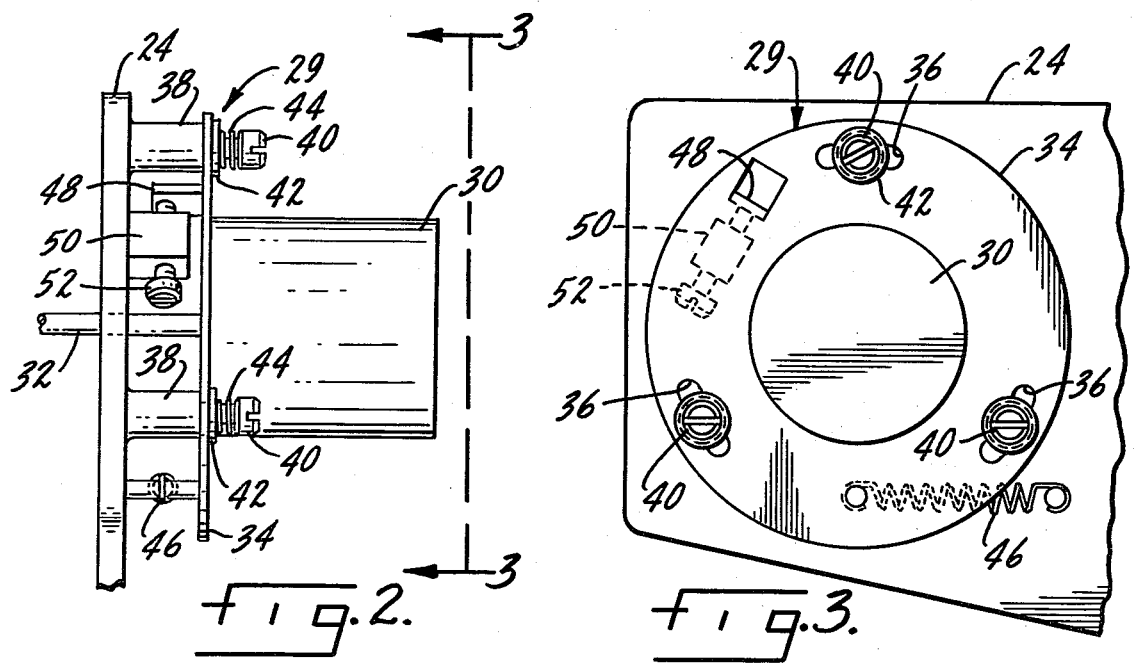

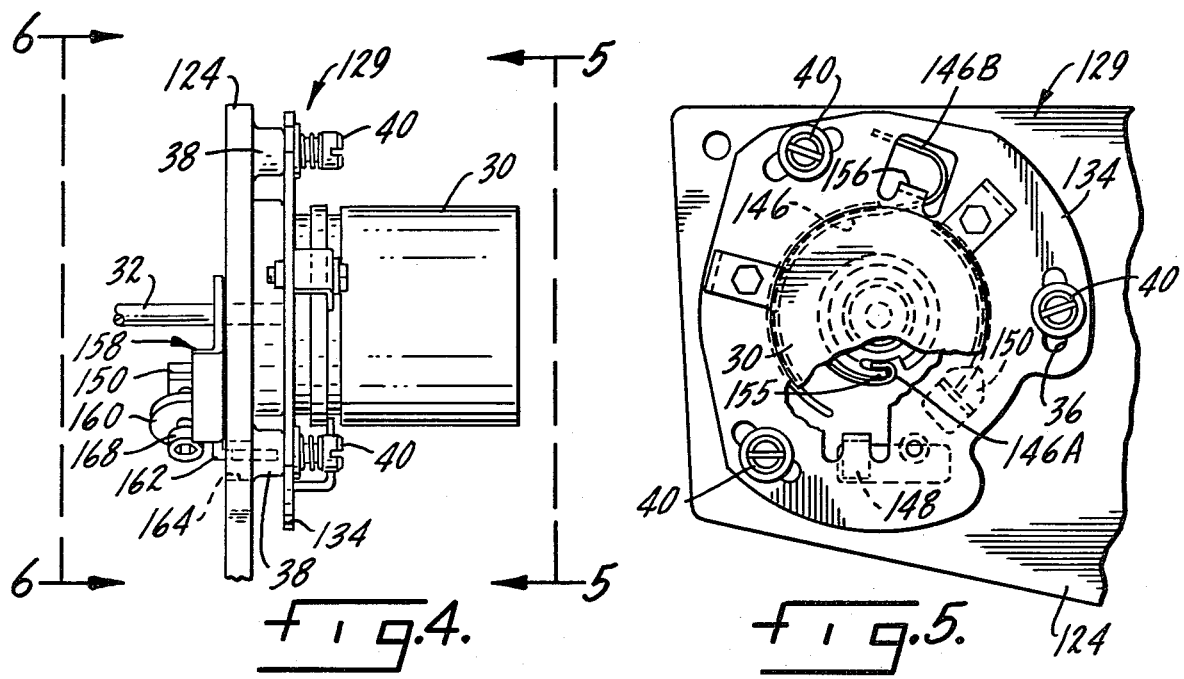
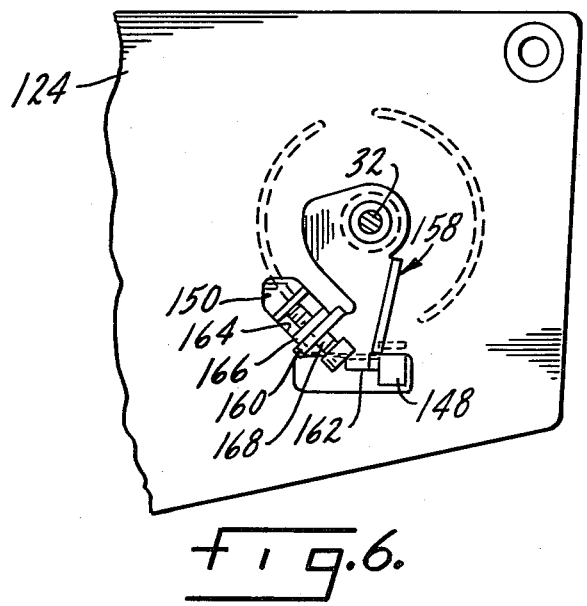

TAPE READER MOTOR MOUNT

BACKGROUND OF THE INVENTION

There are a number of applications in the communications and data processing fields in which information stored on punched paper tapes must be read. Individual data characters, each represented by a unique code of a fixed number of bits, appear on these paper tapes as lateral rows of punched holes. The presence or absence of holes in the respective bit locations of a given row determines the logical state of those bits and the identity of the character represented. Successive characters form successive equally spaced rows along the tape's length. Tapes of this kind are conventionally read by incrementally advancing the tape so that successive character bit rows appear in proper relationship to a hole sensing mechanism.

One conventional technique for tape advancement employs a stepper motor connected to a sprocket drive wheel. The sprocket teeth engage a separate series of sprocket drive holes positioned along the length of the tape. By incrementally advancing the sprocket drive motor through a fixed angle, the tape is advanced to permit sequential data characters to be read.

In such a tape reader, the tape must be accurately positioned for proper decoding. One conventional solution includes a drive motor mounted on a separate plate which, through a series of arcuate slots therein, may be angularly adjusted to effect the requisite alignment. Specifically, the motor mounting plate is attached to the main reader mechanism by screws extending through the arcuate slots. Alignment is accomplished by loosening the screws, rotating the motor until proper decoding occurs, and then retightening the screws. While this procedure has a superficial aura of simplicity, problems occur during manufacture rendering this technique tedious and expensive in production.

These problems arise as a consequence of the precision required for angular alignment. After the mounting screws have been loosened, the motor mounting assembly is relatively free to rotate about the drive sprocket axis. Precise angular adjustment can be rather difficult. Once the correct alignment position has been achieved, another difficulty is encountered in holding the assembly precisely as set while the retention screws are again secured. Any movement requires that the alignment procedure be repeated.

Finally, the very act of tightening the securing screws can, itself, create significant alignment shifts. Alignment errors introduced in tightening the retention screws are correctable only by a hit-or-miss procedure or by a lengthy iterative adjustment process.

SUMMARY OF THE INVENTION

It is a principal object of the present invention, therefore, to provide a new and improved motor mount for a tape reader drive motor that inherently and effectively overcomes the difficulties and disadvantages of previously known techniques as discussed above.

A particular object of the invention is to provide a motor mount for a tape reader drive motor in which a single adjustment control or screw accomplishes the requisite precision alignment.

Another object of the invention is to provide a tape drive motor alignment mechanism in which relatively coarse displacements of the adjustment control or screw produce correspondingly more precise angular drive motor movements, thereby facilitating rapid and accurate reader alignment.

Yet another object of the invention is to provide a motor mount for a tape reader drive motor in which a single alignment step is employed and in which no further tightening or securing steps are required.

Accordingly, the invention relates to a motor mount for a motor-driven photoelectric tape reader or like device in which precise angular orientation of the drive motor about its shaft axis is critical to effective operation. The motor mount comprises first and second base plates, the drive motor being affixed to one of the base plates; the first base plate has a plurality of mounting slots therein, each mounting slot being of arcuate configuration symmetrical with respect to an arcuate segment of a given circle, and a corresponding plurality of retainers each engaging the first base plate, extending through one of the mounting slots, and affixed to the second base plate. First and second aligned fixed stop elements are provided, each affixed to a different one of the base plates; adjustable length stop means is interposed between the first and second stop elements, in engagement with both. A biasing spring interconnects the two base plates and biases the two base plates for relative rotary movement to maintain both fixed stop elements in engagement with the adjustable stop means, permitting adjustment of the angular orientation of the motor over a continuous range, without releasing the retainers, by adjustment of the adjustable stop means.

BRIEF DESCRIPTION OF THE DRAWINGS

FIG. 1 is a front perspective view of a paper tape reader of the type requiring precise angular orientation of the motor and drive sprocket of the tape reader.

FIG. 2 is a side elevation view of one embodiment of the drive motor mount of the present invention.

FIG. 3 is a rear elevation view taken approximately as indicated by line 3—3 in FIG. 2.

FIG. 4 is a side elevation view of another embodiment of the invention.

FIGS. 5 and 6 are elevation views taken approximately as indicated by line 5—5 and 6—6 in FIG. 4.

DESCRIPTION OF THE PREFERRED EMBODIMENT

FIG. 1 illustrates a complete tape reader 10 in which the sprocket drive motor mount of this invention may be incorporated. A segment of punched paper tape 11 is shown properly positioned on a base 12 between two tape edge guide pins 14. A continuous series of evenly spaced drive sprocket holes 16 run longitudinally along tape 11. When the tape is properly positioned, as shown, the teeth of a tape drive sprocket 18 engage the holes 16, further aligning the tape. During operation of reader 10, a head 20 is pivoted down into closed position over tape 11. When the head is in this closed position, both the tape guide pins 14 and the sprocket teeth penetrate the lower surface of the head at openings provided for this purpose. Tape 11, thus constrained, is free to move only in its longitudinal direction (arrow A) in response to rotation of sprocket 18. A series of data characters each uniquely characterized by a pattern of holes 22 in tape 11, with each character comprising a complete lateral row, are shown. The characters illustrated are formed in accordance with a conventional five-bit code. It should be noted that codes containing differing numbers of bits (e.g., the eight-bit ASCII code) may be employed.

A sprocket drive motor 30, as shown in FIG. 2, is mounted behind the base plate 24 of reader 10, and sprocket 18 is mounted on the shaft 32 of motor 30. Paper tape 11 is advanced in discrete increments corresponding to the spacing between adjacent rows so that each character code will, in turn, appear between a series of reader light sources 26 and a corresponding series of photo detectors 28 (FIG. 1). Light emitted by light sources 26 is normally blocked by tape 11 and does not reach photo detectors 28 unless a punched hole appears between the respective light source and photo detector. The change in photo detector state occasioned by such illumination is detected and becomes the tape reader output. Precise alignment of the motor drive sprocket assembly is required in order that the holes corresponding to a given character are accurately positioned between the light sources 26 and photo detectors 28 after each incremental tape advance.

FIGS. 2 and 3 illustrate a motor mount 29 constructed in accordance with a first embodiment of the present invention. In motor mount 29, motor 30 is rigidly affixed to a motor mount base plate 34. Three arcuate mounting slots 36 are formed in base plate 34. Slots 36 are distrubuted approximately equally around the perimeter of base plate 34, each slot being symmetrical with respect to a segment of a circle, the center of which lies on the axis of the motor shaft 32. The motor base plate 34 is positioned parallel to the reader base plate 24 and is secured thereto by three mounting screws 40, with retaining washers 42, and compression springs 44, screws 40 being threaded into three bosses 38 extending rearwardly from the reader base plate. Mounting screws 40, when tightened, compress springs 44 which, in turn, urge washers 42 against the motor base plate 34 holding plate 34 in snug engagement with bosses 38. In this manner the drive sprocket and motor assembly is held firmly but, due to the elongated nature of mounting slots 36, not absolutely rigidly in position. Torsional forces of either clockwise or counter-clockwise sense, applied to the motor assembly, can rotate this assembly within the limits permitted by slots 36.

Motor mount 29, as thus far described, generally resembles the conventional motor mounts described above. In place of the spring loaded retainers 40, 42, 44, however, conventional motor alignment mechanisms utilize mounting screws tightened against the motor base plate to constrain the motor rigidly after the proper alignment position has been determined. Large alignment errors precipitated by relatively trivial angular displacements of the motor assembly, and the possibility of further alignment errors introduced during tightening of the mounting screws, constitute significant drawbacks of this conventional design. The present invention obviates these limitations by providing a single precision adjustment which requires no subsequent locking steps.

Referring specifically to FIG. 3, a counter-clockwise torque is applied to motor 30 and the drive sprocket relative to the fixed reader base plate 24, through a tension bias spring 46. Spring 46 is attached at one end to the reader base plate 24 and at the other end to the motor base plate 34 in such a manner that a tangential force, applied to motor base plate 34 at its perimeter, results in the counter-clockwise rotational moment described. Counter-clockwise movement caused by this force continues until mounting screws 40 come into contact with the ends of slots 36 or until the limits established by an adjustable stop have been reached. It is this latter constraint, described hereinafter, which permits accurate single-step motor alignment. A perpendicular fixed stop 48 is provided on the motor mount base 34, extending toward the reader base plate 24. In a similar manner, a second fixed stop or mounting post 50 is affixed to reader baseplate 24 and extends toward the motor mount base plate 34. A threaded screw hole, parallel to base plates 24 and 34, is provided in stop 50 and accommodates an adjustable stop screw 52. Adjustable stop screw 52 extends through post 50 to engage fixed stop 48, as shown. Bias spring 46, acting on base plates 24 and 34, holds stop 48 firmly against the adjustable stop member 52.

As initially assembled, motor 30 is firmly held in some unique position, determined by the position of adjustable stop 52. Motor alignment is necessary to proper operation of the tape reader. Alignment of a reader employing motor mount 29 epitomizes simplicity. With the tape reader energized, adjustable stop 52 is simply advanced or retracted until a maximum output signal is obtained. No preparatory or subsequent steps are required. Unlike conventional devices, mounting screws 40 are not loosened prior to alignment or retightened following alignment. Thus, the time consuming steps required to loosen and tighten these screws is eliminated. Further, the possibility of inadvertent movement of a correctly aligned motor during the retightening step is eliminated.

A significant achievement of this invention is the precision angular adjustment capabilities afforded by adjustable stop 52. The conventional direct-coupled technique, in which the entire motor mount assembly is repositioned by hand, causes the motor and its drive sprocket to rotate through the same angle as the hand of a person performing the alignment. Small and precise angular adjustments of the sprocket wheel, which are often necessary, require correspondingly small and precise hand movements by the aligner. Adjustment techniques requiring precision of this magnitude require more time and may be beyond the capabilities of relatively unskilled labor. The adjustment mechanism of this invention, on the other hand, permits extremely fine angular movement of the motor and drive sprocket mechanism in response to relatively coarse movement of adjustment screw 52. For example, a 6/32 thread adjustable stop screw mounted one inch from the motor shaft axis produces less than a 2° rotation of the motor and drive sprocket assembly for every complete 360° revolution of the adjustable stop screw. This two hundred fold improvement in adjustment sensitivity permits rapid and accurate alignment even by an unskilled worker.

A second embodiment comprising a motor mount 129, is illustrated in FIGS. 4-6. In motor mount 129 a torsional bias spring 146, positioned between the base plates 124 and 134, replaces the linear bias spring 46 of device 29. As seen in FIG. 5, the inner end of torsion spring 146 is affixed to an inner circular guide rim 155 formed integrally with the reader base plate 124 and spirals outwardly in a clockwise direction. The outer end 146B of spring 146 is connected to a tab 156 on the motor mount base plate 134. Spring 146, when installed, is wound to form a spiral smaller than would otherwise exist if the spring were unrestrained. The force exerted on motor mount plate 134 by torsional spring 146 produces a counter-clockwise torsional moment which is functionally equivalent to that produced in the previous embodiment by the linear bias spring 46. In each case motor 30 is biased toward rotation in a counter-clockwise direction until an adjustable stop device is engaged.

In motor mount 129 (FIGS. 4-6), a fixed stop 150 is attached to the reader base plate 124 and extends forwardly from the base plate. An interface stop member 158 is positioned over motor shaft 32; the interface stop member 158 includes two perpendicular tabs 160 and 162. Tab 160 extends rearwardly through a cutout 164 in the reader base plate 124. Tab 162 projects forwardly. A boss 166 through which an adjustable stop screw 168 is threaded is formed on the forwardly facing tab 160. The counter-clockwise rotation of motor mount plate 134 induced by bias spring 146 causes the motor mount plate stop 148 to contact the rearwardly projecting tab 162 of interface member 158, urging that member to rotate counter-clockwise about motor shaft 32. This counter-clockwise movement brings the adjustable stop screw 168 into engagement with fixed stop 150. In a manner completely analogous to that discussed above, advancing or retracting the adjustable stop screw 168 provides single-step precision angular orientation of motor 30 and, accordingly, drive sprocket 18.

A further advantage of motor mount 129 is that alignment can be accomplished from the front of the tape reader mechanism and does not require tape reader disassembly to access adjustment and mounting screws mounted behind the front panel (base plate 124) as commonly required by conventional adjustment techniques.

From the foregoing description, it will be recognized that the relation of some of the complementary parts can be modified without materially affecting the overall operation and advantages of the motor mount. Thus, in both of the motor mounts 29 and 129, the arcuate slots 36 are formed in the motor mount base plate on which motor 30 is fixedly mounted, and the spring-biased retainers 40 extend through these slots and are secured to the bosses 38 that constitute a part of the reader base plate. If desired, however, the slots could be formed in the reader base plate and the retainers would then be secured to the motor base plates. Another such modification of complementary parts could entail location of the adjustment screw on the side of the motor mount base plate adjacent to the motor 30, using an interface stop member like member 158, if that change is needed for convenient access to the adjustment screw. And, of course, in motor mount 129 (FIGS. 4-6) the adjustment screw 168 can be threaded into the fixed stop 150 instead of tab 160 on interface member 158.

I claim:

1. In a motor-driven photoelectric tape reader or like device in which precise angular orientation of the drive motor about its shaft axis is critical to effective operation, a motor mount comprising:

first and second base plates, the drive motor being affixed to one of the base plates;

the first base plate having a plurality of mounting slots therein, each mounting slot being of arcuate configuration symmetrical with respect to an arcuate segment of a given circle;

a corresponding plurality of retainers each engaging the first base plate, extending through one of the mounting slots, and affixed to the second plate;

first and second aligned fixed stop elements, each affixed to a different one of the base plates;

adjustable length stop means interposed between the first and second stop elements, in engagement with both;

and a biasing spring, interconnecting the two base plates and biasing the two base plates for relative rotary movement to maintain both fixed stop elements in engagement with the adjustable stop means, permitting adjustment of the angular orientation of the motor over a continuous range, without releasing the retainers, by adjustment of the adjustable stop means.

2. An angularly adjustable motor mount for a photoelectrical tape reader or like device, according to claim 1 in which each of the retainers includes a retainer spring, the retainer springs conjointly maintaining the two base plates in parallel alignment but permitting limited rotational movement of the two base plates relative to each other.

3. An angularly adjustable motor mount for a photoelectric tape reader or like device, according to claim 1 or claim 2 in which the adjustable length stop means comprises an adjustment screw threaded through the first fixed stop element and projecting outwardly thereof into engagement with the second fixed stop element.

4. An angularly adjustable motor mount for a photoelectric tape reader or like device, according to claim 1 or claim 2 in which the adjustable stop means comprises an interface stop member, mounted intermediate the two fixed stop elements, and an adjustment member of variable length interposed between the interface stop member and one of the fixed stop elements.

5. An angularly adjustable motor mount for a photoelectric tape reader or like device, according to claim 4 in which the adjustment member comprises a screw mounted on the interface stop member and projecting toward the one fixed stop element.

6. An angularly adjustable motor mount for a photoelectric tape reader or like device, according to claim 5 in which the interface stop member is concentrically rotatably mounted relative to the motor shaft, and includes first and second opposed tabs projecting toward the fixed stop elements on the first and second base plates, respectively, and in which the adjustment member is located on the outer side of the base plate to which the motor is not fixed, thus permitting precision adjustment of the angular alignment of the motor without requiring access to the motor or its retainers.

7. An angularly adjustable motor mount for a photoelectric tape reader or like device, according to claim 1 or claim 2, in which the biasing spring is a torsion spring disposed in encompassing relation to the motor shaft between the two base plates.

* * * * *